Aug. 5, 1958 G. JERNAKOFF 2,846,586

DRIFT COMPENSATOR FOR DIRECT-COUPLED AMPLIFIER

Filed May 18, 1955

Inventor
George Jernakoff
by Merton D Moore
His Attorney 2,846,586
Patented Aug. 5, 1958

2,846,586

DRIFT COMPENSATOR FOR DIRECT-COUPLED AMPLIFIER

George Jernakoff, Loudonville, N. Y., assignor to General Electric Company, a corporation of New York Application May 18, 1955, Serial No. 509,233
3 Claims. (Cl. 250—41.9)

Figure 1:
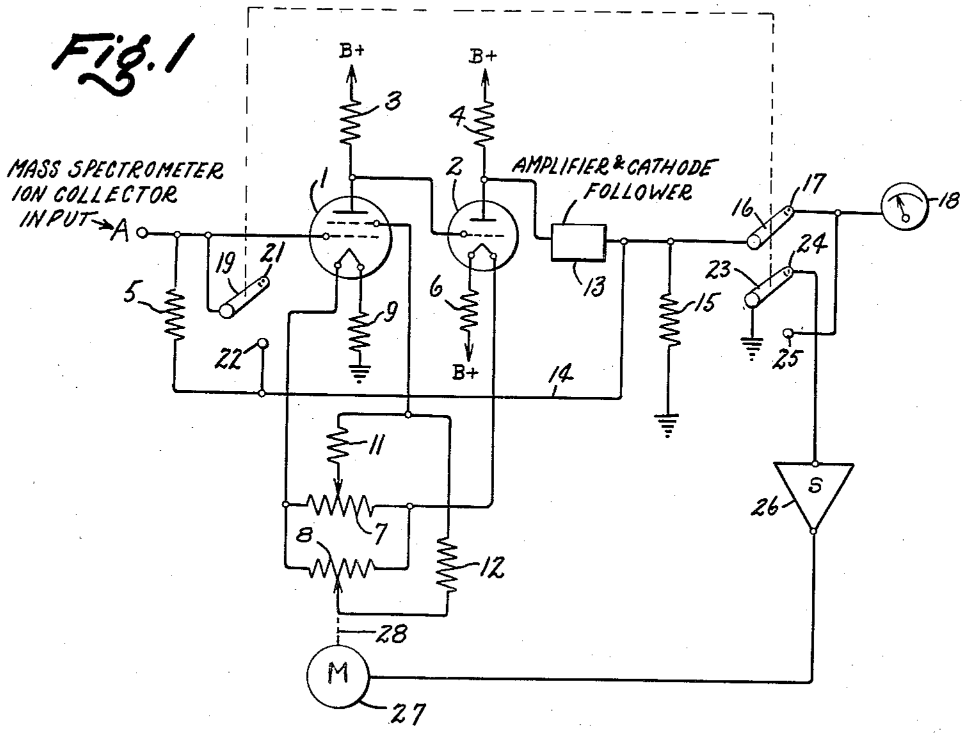

This invention relates to direct-coupled amplifiers, and more particularly to an automatic drift compensator for such amplifiers.

It is well known in the art that when the steady current or voltage supplied by a given electrical device, or the change in the steady value thereof, is too small to actuate a direct-current indicating instrument or relay, a direct-coupled amplifier can be used. Such amplifiers are frequently used in the measurement of small direct currents in the relays and sounders of telegraphy or telephony equipment, and in applications of photoelectric tubes.

Direct-coupled amplifiers are also necessary when the voltage to be amplified is one that slowly changes and when its wave shape must be preserved, as in electrocardiography. For further information concerning direct-coupled amplifiers and their uses, attention is directed toward a text published in 1943 by the Technology Press of the Massachusetts Institute of Technology, entitled "Applied Electronics" and written by the members of the staff of the Department of Electrical Engineering of the Massachusetts Institute of Technology, pages 466–470.

Such direct-coupled amplifiers are inherently unstable due to the fact that the characteristics of vacuum tubes change slightly with time, and their bias and supply voltages likewise change with time. Direct-coupled amplifiers are particularly sensitive to such changes, because changes in the first stage are amplified by the succeeding stages. Therefore, degenerative feedback is often used in such amplifiers in order to minimize their drift. Such feedback, while it materially cuts down the drift of direct-coupled amplifiers, does not entirely eliminate it; and over long periods of time, drift may cause serious errors in the measurement of small direct currents.

This is the situation when such amplifiers are used in mass spectrometers or ionization gages, in process control applications, when the instruments are continuously operated for long periods of time and must amplify currents in the order of $10^{-15}$ amperes. In the past, the direct-coupled amplifiers used in such apparatus have been rebalanced manually at intervals in order to compensate for their drift. The present invention is designed to rebalance automatically direct-coupled amplifiers at recurrent intervals of time, thereby eliminating the need for constant manual rebalancing as well as making it possible to use a cheaper and more unstable amplifier with equipment utilized for process control.

It is, therefore, one object of this invention to provide an automatic drift compensator for direct-coupled amplifiers.

Another object of this invention is to provide an automatic drift compensator for a direct-coupled amplifier that is synchronized with the operation of a mass spectrometer.

Other objects and advantages will appear as the description of the invention proceeds.

In accordance with the invention, the output of a direct-coupled amplifier is recurrently fed into the input of a balancing circuit and, simultaneously, the input terminals of the amplifier are short circuited. The balancing circuit employs a motor that is activated by the output of the amplifier and varies the output of the direct-coupled amplifier until it is zero; then the amplifier is reconnected to its input and output circuits for further measurements. The switching for this invention can be synchronized with the sweep circuit of a mass spectrometer, for example, in order to balance the amplifier during given sweep cycles of the mass spectrometer.

Figure 2:
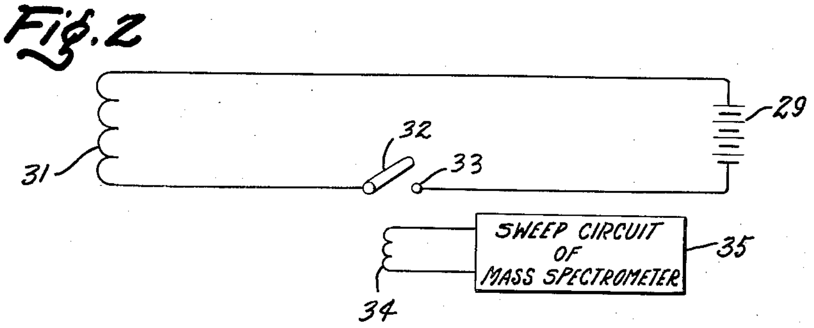

The features of the invention which are believed to be novel and patentable are pointed out in the claims which form a part of this specification. For a better understanding of the invention, reference is made in the following description to the accompanying drawing, wherein like parts are indicated by like reference numerals, in which:

Fig. 1 is a circuit and block diagram of the automatic drift compensator of the invention; and Fig. 2 is a schematic and block diagram of an actuating circuit for periodically operating the circuit of Fig. 1.

Referring now to Fig. 1, there is shown a direct-coupled amplifier comprising a tetrode 1 and a triode 2, tube 1 having a load resistor 3 connected between its anode and a source of positive potential labelled B+, and tube 2 having a load resister 4 connected between its anode and B+. The anode of tube 1 is directly coupled to the control grid of tube 2.

An input terminal for the direct-coupled amplifier is also provided and labelled A, this terminal being connected to the control grid of tube 1; and an input resistor 5 is connected to terminal A. Fed into terminal A is the output from a mass spectrometer ion collector electrode, as indicated. The cathode of tube 2 is connected through a resistor 6 to B+ at one end, the other end being connected through a pair of potentiometers 7 and 8 to one end of the cathode of tube 1. The other end of the cathode of tube 1 is connected through a resistor 9 to ground.

A movable tap is provided on potentiometer 7 which is connected through a resistor 11 to the screen grid of tube 1 and also through a resistor 12 to a movable tap on potentiometer 8. Connected to the anode of tube 2 is an amplifier and a cathode follower 13, and the output of the cathode follower is fed through a lead 14 and resistor 5 to the control grid of tube 1 and provides the degenerative feedback noted above. The amplifier of element 13 provides a feedback of the proper phase, and the cathode follower serves as an isolating stage. The output from the cathode follower is derived across a resistor 15 connected between cathode follower 13 and ground, and this output is fed through a switch arm 16 and a terminal 17 to a meter 18, such as a microammeter.

Ganged with the switch arm 16 is a switch arm 19 shown as touching a contact 21 in its upper position, a contact 22 being provided for this switch arm in its lower position, contact 22 being connected to the lower input terminal A. Also ganged with the switch arms 16 and 19 is a switch arm 23 having one end grounded and its other end being shown as touching a contact 24 in its upper position, this switch arm also being adapted to touch a contact 25, connected to meter 18, when the arm is in its lower position. Switch arms 16, 19 and 23 are normally held by springs (not shown) in their upper positions against contacts 17, 21 and 24, respectively. Connected to contact 24 is a servo amplifier 26 labelled S, for transmitting an electrical actuating signal into a servo motor 27 labelled M, which motor is mechanically coupled by a shaft 28 to the movable tap on potentiometer 8. Suitable servo amplifiers and motors are, of course, well known in the art, and will not be further described here.

The operation of the drift compensator shown in Fig. 1 is as follows: Assuming switch arms 16, 19 and 23 in their upper positions, an input signal fed into terminal A is amplified by direct-coupled amplifier tubes 1 and 2, and fed through stage 13 into meter 18 by way of switch arm 16 and terminal 17. Also, a portion of this signal is fed back degeneratively along lead 14 to the input terminal A in order to decrease any drift in the direct-coupled amplifier. With the switch arms in the above-noted positions, servo amplifier 26 is grounded through terminal 24 and switch arm 23.

Now switch arms 16, 19 and 24 are thrown into their lower positions. Switch arm 19 is therefore touching contact 22 and serves to short circuit the input resistor 5, thus insuring that only signals due to drift exists in the direct-coupled amplifier. Switch arm 16 is now disconnected from meter 18 and is connected to contact 24, switch arm 23 now touching contact 25 and serving to ground meter 18 out of the circuit.

The output of cathode follower 13 is therefore fed through switch arm 16 and contact 24 to the servo amplifier 26, the servo amplifier activating servo motor 27 and moving the movable tap of potentiometer 8. Since the only output from the direct-coupled amplifier is due to drift signals, it will be apparent that by this circuit, the movement of the movable tap of potentiometer 8 is caused to be controlled by these signals.

It should be noted that potentiometers 7 and 8 and resistors 11 and 12 form a bridge circuit whose unbalance signal is placed upon the screen grid of tube 1. Consequently, the movement of the tap of potentiometer 8 serves to vary the gain of tube 1 until the bridge is rebalanced, a condition that can only be achieved when the signal output from cathode follower 13 is equal to zero. At this point, the direct-coupled amplifier is once again balanced and any drift voltages have been cancelled out. Unicontrolled switch arms 16, 19 and 24 are now thrown to their upper positions, and the normal reading of the output from the direct-coupled amplifier can once again be observed upon the face of meter 18. If it is desired to rebalance the direct-coupled amplifier manually, the movable tap of potentiometer 7 can be adjusted by the operator to achieve the desired balance.

Referring now to Fig. 2, there is shown a circuit for use with a mass spectrometer which could serve the purpose of periodically operating switch arms 16, 19 and 23 of Fig. 1 in order to rebalance periodically the direct-coupled amplifier. This figure discloses a source of direct-current potential 29 connected to a coil 31 when a switch arm 32 is caused to touch a contact 33. The actuation of coil 31 serves to draw switch contacts 16, 19 and 23 down into their lower positions, and since these switch contacts are spring biased, they fly to their upper positions as soon as switch arm 32 leaves contact 33. It will therefore be apparent that the movement of switch arms 16, 19 and 23 can be controlled by moving switch arm 32 in and out of contact with contact 33. This latter movement is achieved by energization of a coil 34 connected to the sweep circuit of a mass spectometer 35. Therefore, during a portion of every sweep of circuit 35, coil 34 is actuated and switch arm 32 touches contact 33, thus activating coil 31 and rebalancing the direct-coupled amplifier of Fig. 1.

The following constitutes a listing of the values of the various elements shown in Fig. 1, and it should be understood that these values and tube types are intended only to be of an illustrative nature, since this invention is intended to operate with any type of direct-coupled amplifier.

Tube 1 may be a tetrode of the 5886 type, and tube 2 may be a triode of the 6072 type.

Resistors 11, 12 and 15 may have values of 10,000 ohms each; resistor 3 may have a value of 10 megohms; resistor 4 may have a value of 5 megohms; resistor 5 may have a value of $10^{10}$ ohms; resistor 6 may have a value of 5,000 ohms; and resistor 9 may have a value of 100 ohms.

Potentiometers 7 and 8 may have values of 400 ohms each.

Further, it should be understood that although the invention is particularly useful with a mass spectrometer, it could be used with an ionization gauge, or any other device where automatic rebalancing of a direct-coupled amplifier may be desired. It should also be clear that the rebalancing of the direct-coupled amplifier, which was described above as taking place during every sweep cycle of a mass spectrometer, could also be easily made to occur every second or third sweep cycle, or for that matter at any desired time. Such a modification will be readily apparent to those skilled in the art.

It is believed to be apparent that there has been described a new and useful automatic drift compensator for direct-coupled amplifier, a circuit which has been made possible to eliminate the constant bother of manual rebalance previously thought necessary in the art. Further, the present circuit has also made it possible to use a cheaper and more unstable direct-coupled amplifier with such instruments as mass spectrometers without any practical loss of accuracy, thereby materially reducing the costs of these instruments.

While there has been described what is at present considered a preferred embodiment of the invention, it will be obvious to those skilled in the art that various changes and modifications may be made therein without departing from the invention, and it is aimed by the appended claims to cover all such changes and modifications as fall within the true spirit and scope of the invention.

What I claim as new and desire to secure by Letters Patent of the United States is:

1. In combination with a direct-coupled amplifier having an input and an output circuit, a balancing circuit for said amplifier comprising, switch means for recurrently short circuiting the input circuit of said amplifier, first and second potentiometer means connected in parallel to a source of potential and respectively having first and second movable taps connected to said amplifier for varying the gain of said amplifier as they are moved, servo amplifier means recurrently coupled to the output circuit of said amplifier, and servo motor means coupled to and operated by the output from said servo amplifier means, said servomotor means being connected to said second tap for moving this tap to vary the gain of said amplifier until its output is equal to zero when its input circuit is short circuited, the gain of said amplifier also being adjustable by manual movement of said first tap.

2. In combination with an instrument producing a low level electrical output and a direct-coupled amplifier having an input circuit coupled to the output of said instrument and an output circuit, a balancing circuit for said amplifier comprising, switch means operated by said instrument for periodically short circuiting the input circuit of said amplifier, first and second potentiometer means connected in parallel to a source of potential and respectively having first and second movable taps connected to said amplifier for varying the gain of said amplifier as they are moved, servo amplifier means periodically coupled to the output circuit of said amplifier by said instrument, and servomotor means coupled to and operated by the output from said servo amplifier means, said servomotor means being connected to said second tap for moving this tap to vary the gain of said amplifier until its output is equal to zero when its input circuit is short circuited, the gain of said amplifier also being adjustable by manual movement of said first tap.

3. In combination with a mass spectrometer and a direct-coupled amplifier having an input circuit coupled to the output of said mass spectrometer and an output circuit, a balancing circuit for said amplifier comprising, switch means operated by said mass spectrometer for periodically short circuiting the input circuit of said amplifier, first and second potentiometer means connected in parallel to a source of potential and respectively having first and second movable taps connected to said amplifier for varying the gain of said amplifier as they are moved, servo amplifier means periodically coupled to the output circuit of said amplifier by said mass spectrometer, and servomotor means coupled to and operated by the output from said servo amplifier means, said servomotor means being connected to said second tap for moving this tap to vary the gain of said amplifier until its output is equal to zero when its input circuit is short circuited, the gain of said amplifier also being adjustable by manual movement of said first tap.

References Cited in the file of this patent

UNITED STATES PATENTS

| | | |
|---|---|---|
| 2,685,000 | Vance | July 27, 1954 |
| 2,724,022 | Williams et al. | Nov. 15, 1955 |
| 2,730,573 | Sedgefield et al. | Jan. 10, 1956 |
| 2,734,949 | Berry | Feb. 14, 1956 |